(12) United States Patent
Condello et al.

(10) Patent No.: US 11,491,806 B2
(45) Date of Patent: Nov. 8, 2022

(54) CURE CONFIRMATION SYSTEM AND METHOD FOR THREE DIMENSIONAL OBJECT PRINTER

(71) Applicant: Xerox Corporation, Norwalk, CT (US)

(72) Inventors: Anthony S. Condello, Webster, NY (US); Jack T. LeStrange, Macedon, NY (US); Peter J. Knausdorf, Henrietta, NY (US); Mandakini Kanungo, Penfield, NY (US); Xin Yang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 286 days.

(21) Appl. No.: 16/879,756

(22) Filed: May 20, 2020

(65) Prior Publication Data
US 2020/0282718 A1    Sep. 10, 2020

Related U.S. Application Data

(62) Division of application No. 15/472,867, filed on Mar. 29, 2017, now Pat. No. 10,688,773.

(51) Int. Cl.
| | |
|---|---|
| *B05C 9/14* | (2006.01) |
| *B05C 11/04* | (2006.01) |
| *B41M 7/00* | (2006.01) |
| *B41J 11/00* | (2006.01) |
| *B33Y 10/00* | (2015.01) |

(Continued)

(52) U.S. Cl.
CPC ........... *B41J 11/00214* (2021.01); *B05C 9/14* (2013.01); *B05C 11/042* (2013.01); *B29C 64/129* (2017.08); *B29C 64/386* (2017.08); *B33Y 10/00* (2014.12); *B33Y 30/00* (2014.12); *B33Y 50/02* (2014.12); *B41M 7/0081* (2013.01); *B29K 2105/0058* (2013.01)

(58) Field of Classification Search
None
See application file for complete search history.

(56) References Cited

U.S. PATENT DOCUMENTS

| | | |
|---|---|---|
| 4,792,817 A | 12/1988 | Barney |
| 6,238,039 B1 | 5/2001 | Balakrishnan et al. |

(Continued)

FOREIGN PATENT DOCUMENTS

DE    102010034780 A1    2/2012

OTHER PUBLICATIONS

Consolidated Label Company, "UPC Barcodes: What You Need to Know" Jan. 20, 2015.

(Continued)

*Primary Examiner* — Binu Thomas

(57) ABSTRACT

A print system and a method for confirming complete curing of a marking material are disclosed. For example, the print system includes a plurality of printheads arranged in a two-dimensional array, a curing light source, a curing confirmation system, a movable member to hold an object and a controller to control movement of the movable member to move the object past the array of printheads, to operate the plurality of printheads to eject the marking material onto the object as the object passes the two-dimensional array of printheads, to operate the curing light source to cure the marking material and to operate the curing confirmation system to confirm that the curing of the marking material is complete.

17 Claims, 4 Drawing Sheets

(51) Int. Cl.
*B33Y 30/00* (2015.01)
*B33Y 50/02* (2015.01)
*B29C 64/129* (2017.01)
*B29C 64/386* (2017.01)
*B29K 105/00* (2006.01)

(56) References Cited

U.S. PATENT DOCUMENTS

| | | | |
|---|---|---|---|
| 7,300,129 | B2 | 11/2007 | Kumamoto et al. |
| 7,766,473 | B2 | 8/2010 | Hoshino |
| 8,511,782 | B2 | 8/2013 | Chang et al. |
| 9,217,090 | B2 | 12/2015 | Donohoe et al. |
| 9,827,790 | B1 | 11/2017 | Moore et al. |
| 10,087,020 | B1* | 10/2018 | Ruiz .............. B25J 15/0023 |
| 2002/0134257 | A1 | 9/2002 | Stephenson |
| 2002/0191036 | A1 | 12/2002 | Park |
| 2003/0151656 | A1 | 8/2003 | Kokubo et al. |
| 2005/0179721 | A1 | 8/2005 | Jones et al. |
| 2005/0253912 | A1* | 11/2005 | Smith ............. B41J 11/00222 347/102 |
| 2006/0201018 | A1* | 9/2006 | McKay ................. F26B 3/28 522/148 |
| 2006/0290760 | A1 | 12/2006 | German et al. |
| 2007/0058020 | A1* | 3/2007 | Wetjens ............. C09D 11/101 347/102 |
| 2009/0207203 | A1 | 8/2009 | Yamamoto |
| 2009/0231403 | A1 | 9/2009 | Shi et al. |
| 2010/0039487 | A1 | 2/2010 | Sawatsky |
| 2010/0154244 | A1 | 6/2010 | Kuta et al. |
| 2010/0192792 | A1 | 8/2010 | Hall |
| 2010/0328083 | A1 | 12/2010 | Dillon |
| 2012/0062628 | A1 | 3/2012 | Nagai |
| 2012/0241636 | A1* | 9/2012 | Ahn .................. G01N 27/622 250/389 |
| 2013/0044172 | A1* | 2/2013 | Nakajima ........... B41J 11/0021 347/102 |
| 2014/0002557 | A1 | 1/2014 | Condello et al. |
| 2014/0176635 | A1* | 6/2014 | Portela Mata ......... B41J 29/377 347/19 |
| 2014/0242346 | A1 | 8/2014 | Nielsen et al. |
| 2015/0017271 | A1 | 1/2015 | Donaldson et al. |
| 2015/0017272 | A1 | 1/2015 | Donaldson et al. |
| 2015/0158310 | A1 | 6/2015 | Olejniczak et al. |
| 2015/0224680 | A1* | 8/2015 | Oestergaard ........ B41F 23/0409 425/150 |
| 2015/0224765 | A1 | 8/2015 | Fukasawa |
| 2015/0231897 | A1 | 8/2015 | Noell |
| 2015/0273864 | A1 | 10/2015 | Moehringer et al. |
| 2017/0341414 | A1 | 11/2017 | Buchar et al. |
| 2018/0001662 | A1 | 1/2018 | Buchar et al. |
| 2018/0281308 | A1 | 10/2018 | Praharaj et al. |
| 2018/0281310 | A1 | 10/2018 | LeFevre et al. |
| 2018/0281311 | A1 | 10/2018 | Herrmann et al. |
| 2019/0031791 | A1* | 1/2019 | Kanungo ........... B41J 11/00214 |

OTHER PUBLICATIONS

Zeng "Control of Robotic UV Curing Process with Thermal Vision Feedback Through Two IR Cameras", Proceedings of the ASME 2009 International Mechanical Engineering Congress & Exposition, IMECE 2009-13007, pp. 1-9, 2009.

Detecting VOCs with PID—how it works. Crowcon Detection Instruments LTD. May 7, 2015. retrieved online Sep. 17, 2019.

Kay, "Using Multi-Zone Irradiance Control in UV LED Systems" ASI Adhesives & Sealants Industry Oct. 1, 2015.

* cited by examiner

CURE CONFIRMATION SYSTEM AND METHOD FOR THREE DIMENSIONAL OBJECT PRINTER

CROSS REFERENCE TO RELATED APPLICATIONS

This application is a divisional of U.S. patent application Ser. No. 15/472,867, filed on Mar. 29, 2017, which is hereby incorporated by reference in its entirety.

The present disclosure relates generally to curing systems and, more particularly, to an apparatus and method for confirming complete curing of ultra violet (UV) cured inks in a three dimensional (3D) object printer.

BACKGROUND

Some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

Although UV inks contain little or no solvent, the UV inks may still emit some volatile organic compounds (VOCs) if the UV ink is not completely cured. VOCs are considered to have a negative impact on the environment and the end user. Furthermore, if the UV ink is not completely cured, the UV ink that is printed onto the article or object may be wiped off.

SUMMARY

According to aspects illustrated herein, there are provided a print system and a method for confirming complete curing of a marking material. One disclosed feature of the embodiments is a print system that comprises a plurality of printheads arranged in a two-dimensional array, wherein each one of the plurality of printheads is configured to eject a marking material, a curing light source coupled to the two-dimensional array of the plurality of printheads, a curing confirmation system coupled to the curing light source, a movable member to hold an object, wherein the movable member is positioned parallel to a plane formed by the two-dimensional array of the plurality of printheads, the curing light source and the curing confirmation system, and a controller to control movement of the movable member to move the object past the array of printheads, to operate the plurality of printheads to eject the marking material onto the object as the object passes the two-dimensional array of printheads, to operate the curing light source to cure the marking material and to operate the curing confirmation system to confirm that the curing of the marking material is complete.

Another disclosed feature of the embodiments is a method for confirming complete curing of a marking material. In one embodiment, the method comprises moving an object vertically parallel to a plane of a two-dimensional array of a plurality of printheads to eject the marking material by the plurality of printheads onto the object, moving the object vertically parallel to the plane in front of a curing light source, curing the marking material via the curing light source, moving the object vertically parallel to the plane in front of a curing confirmation system and determining whether the curing of the marking material is complete.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for confirming complete curing of UV cured inks in a 3D object printer. As discussed above, some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent evaporates from the ink. Rather, the UV ink is cured such that the polymers in the UV ink undergo a chemical reaction to link or bond to the article or object.

Although UV inks contain little or no solvent, the UV inks may still emit some volatile organic compounds (VOCs) if the UV ink is not completely cured. VOCs are considered to have a negative impact on the environment and the end user. Furthermore, if the UV ink is not completely cured, the UV ink that is printed onto the article or object may be wiped off.

Embodiments of the present disclosure provide a novel apparatus and method that provides confirmation of complete curing of the UV ink printed on a 3D object. The apparatus may be part of the 3D object printer. Said another way, the apparatus may be in-line to the overall printing process of the 3D object printer.

Figure 1:
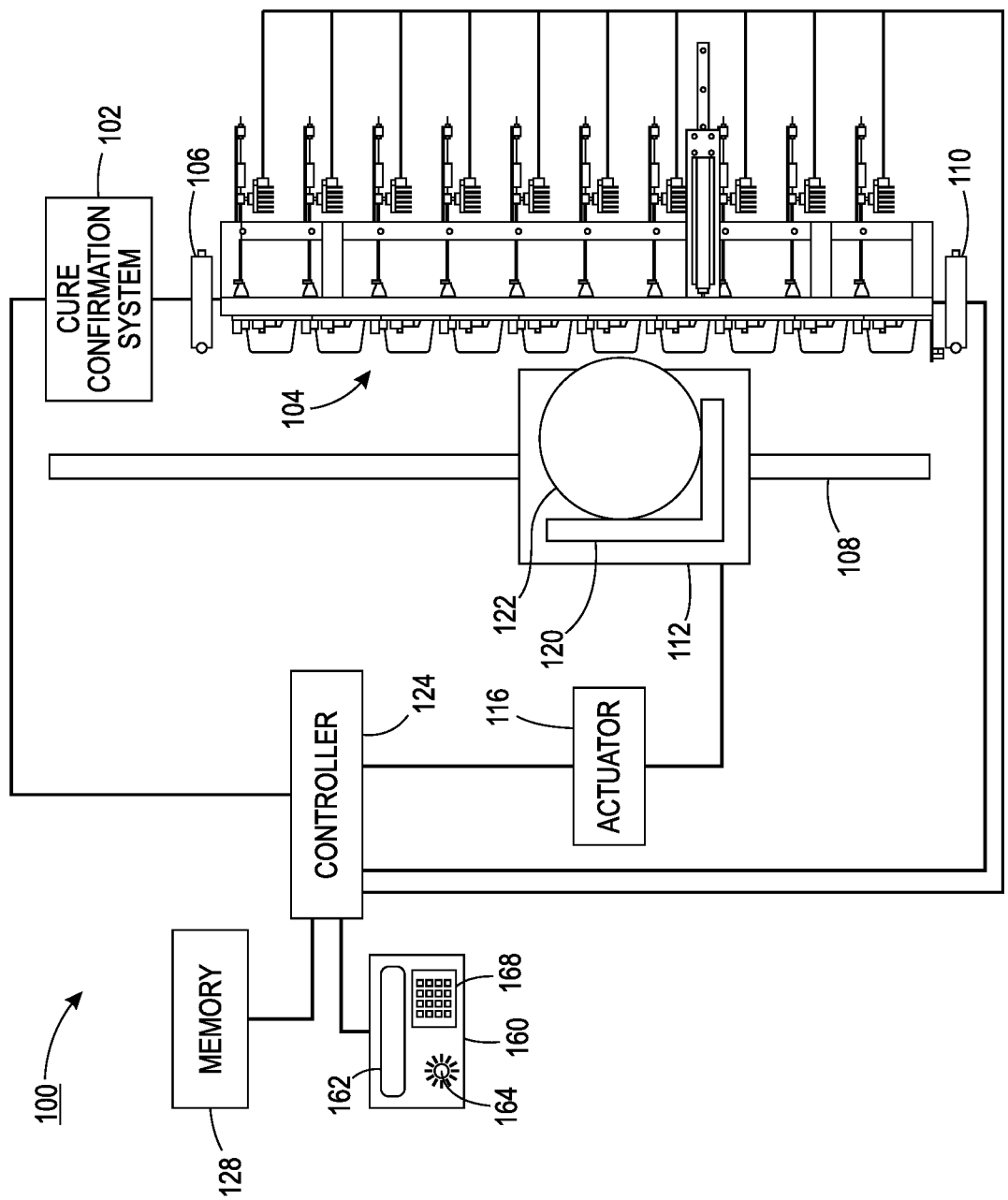
FIG. 1 illustrates an example 3D object printer of the present disclosure.

FIG. 1 illustrates an example printing system 100 configured to print on an object 122. The object 122 may be a three dimensional (3D) object that has an irregular shape. For example, the object 122 may have one or more different curved surfaces with different amounts of curvature. Said another way, the object 122 may not have a flat surface.

In one embodiment, the printing system 100 includes an array, or a plurality, of printheads 104, a support member 108, a member 112 movably mounted to the support member 108, an actuator 116 operatively connected to the movably mounted member 112, an object holder 120 configured to mount to the movably mounted member 112, and a controller 124 operatively connected to the plurality of printheads and the actuator. As shown in FIG. 1, the array of printheads 104 is arranged in a two-dimensional array, which in the figure is a 10×1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material.

In one embodiment, the marking material may be an ultra violet (UV) ink. The marking material may be cured by a curing light source 106. The curing light source 106 may be positioned to cure the marking material after the marking material is ejected by the array of printheads 104. For example, the curing light source 106 may be positioned vertically above or below the array of printheads 104 depending on which direction printing occurs along the support member 108. Said another way, the curing light source 106 may be stacked above or below the array of printheads 104 along a plane formed by the array of printheads 104.

In one embodiment, the controller 124 may also be operatively coupled to the curing light source 106 to control an amount and a duration of light applied to the marking material for curing. In other words, the curing light source 106 may be used to initiate a photochemical reaction that generates a crosslinked network of polymers. In other words, the ink is not simply "dried" where solvent is evaporated from the ink. Rather, the marking material (e.g., the UV ink) is cured such that the polymers in the marking material undergo a chemical reaction to link or bond to the object 122.

In one embodiment, the curing light source 106 may be a two dimensional array of light emitting diodes (LEDs). The LEDs may be UV emitting LEDs that can cure the marking material.

In one embodiment, the printing system may include a cure confirmation system 102. The cure confirmation system 102 may be positioned to confirm that the curing system of the marking material is complete after the curing light source 106 has cured the marking material on the object 122. For example, the cure confirmation system 102 may be positioned vertically above or below the curing light source 106 and the array of printheads 104 depending on which direction printing occurs along the support member 108. Said another way, the cure confirmation system 102 may be stacked directly above or below the curing light source 106 along the plane formed by the array of printheads 104.

As noted above, the marking material may be cured via the curing light source 106. However, insufficient curing can cause harmful volatile organic compounds (VOCs) to be emitted from the marking material. The cure confirmation system 102 may confirm marking material is completely cured.

The controller 124 may be operatively coupled to the cure confirmation system 102. If the cure confirmation system 102 confirms that the marking material is completely cured, the printing process may end. However, if the cure confirmation system 102 determines that the marking material is not completely cured, the controller 124 may control the actuator 116 to move the member 112 back in front of the curing light source 106 for additional curing. A more detailed diagram and description of the cure confirmation system 102 is provided below.

In one embodiment, the support member 108 is positioned to be parallel to the plane formed by the array of printheads and, as shown in FIG. 1, is oriented so one end of the support member 108 is at a higher gravitational potential than the other end of the support member 108. This orientation enables the printing system 100 to have a smaller footprint than an alternative embodiment that horizontally orients the two-dimensional array of printheads and configures the support member, the member, and the object holder to enable the object holder to pass objects past the horizontally arranged printheads so the printheads can eject marking material downwardly on the objects.

The member 112 is movably mounted to the support member 108 to enable the member to slide along the support member 108. In some embodiments, the member 112 can move bi-directionally along the support member 108. In other embodiments, the support member 108 is configured to provide a return path to the lower end of the support member 108 to form a track for the member 112. The actuator 116 is operatively connected to the member 112 so that the actuator 116 can move the member 112 along the support member 108 and enable the object holder 120 connected to the member 112 to pass the two-dimensional array of the plurality of printheads 104 in one dimension of the two-dimensional array of printheads 104.

In the embodiment, the object holder 120 moves the object 122 along a length dimension of the array of printheads 104. The object holder 120 may have different shapes and sizes depending on a shape and size of the object 122. For example, different object holders 120 may be coupled to the member 112 for different objects 122. The object holder 120 may be custom built for each different type of object 122 that is used in the printing system 100.

In one embodiment, the printing system 100 may include an optical sensor 110. The optical sensor 110 may be a scanner to scan a stock keeping unit (SKU) or barcode on the object 122. The SKU may provide information to the controller 124 with regards to how to control the array of printheads 104 to print an image onto the surface of the object 122. For example, different shaped objects 122 may have different printing profiles that may be included into the SKU.

In one embodiment, the optical sensor 110 may be a scanner that can scan the object 122 to determine a profile of the object 122. For example, the printing system 100 may determine a printing profile on-the-fly using the optical sensor 110. The surface profile scanned by the optical sensor 110 may be transmitted to the controller 124. The controller 124 may then calculate a sequence of operation of the printheads of the array of printheads 104 and an amount of marking material to eject from each printhead.

In one embodiment, the controller 124 is configured with programmed instructions stored in a memory 128 operatively connected to the controller so the controller can execute the programmed instructions to operate components in the printing system 100. Thus, the controller 124 is configured to operate the actuator 116 to move the object holder 120 past the array of printheads 104 and to operate the array of printheads 104 to eject marking material onto the object 122 held by the object holder 120 as the object holder 120 passes the array of printheads 104.

In one embodiment, the controller 124 may also be operatively coupled to an interface 160. The interface 160 may include a display 162, an annunciator 364 and an input device 168, such as a keypad. The interface 160 may be used to notify an operator if a printing program for a particular SKU is not available, display error messages, completion messages, and the like, on the display 162. The annunciator 164 may provide a warning light or an audible alarm to attract attention to messages on the display 162 or to indicate an error has occurred.

Additionally, the controller 124 is configured to operate the inkjets within the printheads of the array of printheads 104 so they eject drops with larger masses than the masses of drops ejected from such printheads. In one embodiment, the controller 124 operates the inkjets in the printheads of the array of printheads 104 with firing signal waveforms that enable the inkjets to eject drops that produce drops on surfaces of the object 122 having a diameter of about seven to about ten millimeters (mm). This drop size is appreciably larger than the drops that produced drops on the material receiving surface having a mass of about 21 nanograms (ng).

It should be noted that the orientation of the components of the printing system 100 is provided as an example. For example, FIG. 1 illustrates the printing process moved vertically upwards from the bottom of the page towards the top of the page. However, it should be noted that the components may be flipped such that the printing process may move vertically downwards from the top of the page to the bottom of the page.

The system configuration shown in FIG. 1 is especially advantageous in a number of aspects. For one, as noted above, the vertical configuration of the array of printheads 104 and the support member 108 enables the printing system 100 to have a smaller footprint than a system configured with a horizontal orientation of the array and support member. This smaller footprint of the printing system 100 enables the printing system 100 to be housed in a single cabinet and installed in non-production outlets. Once installed, various object holders can be used with the system to print a variety of goods that are generic in appearance until printed.

Another advantageous aspect of the printing system 100 shown in FIG. 1 is the gap presented between the objects 122 carried by the object holder 120 and the printheads of the array of printheads 104. The gap in this embodiment is in a range of about five to about six mm. Heretofore, the gap was maintained in a range centered about 1 mm. This smaller gap was thought to ensure a more accurate placement of drops from an ejecting printhead. It has been discovered that the greater gap width reduces the effect of laminar air flow in the gap between the printheads and the surface receiving the marking material drops so the accuracy of drop placement, especially for larger 3D objects, is maintained. This effect is particularly effective with the larger drop sizes noted previously. Without the turbulence produced by the movement of an object in close proximity to a printhead, the momentum of the ejected drops is adequate to keep the drops on their projected course so the registration of the drops from different printheads can be preserved for maintaining image quality. Additionally, the controller 124 can be configured with programmed instructions to operate the actuator 116 to move the object holder 120 at speeds that attenuate the air turbulence in the larger gap between the printhead and the surface of the object 122 used in the printing system 100.

Figure 2:
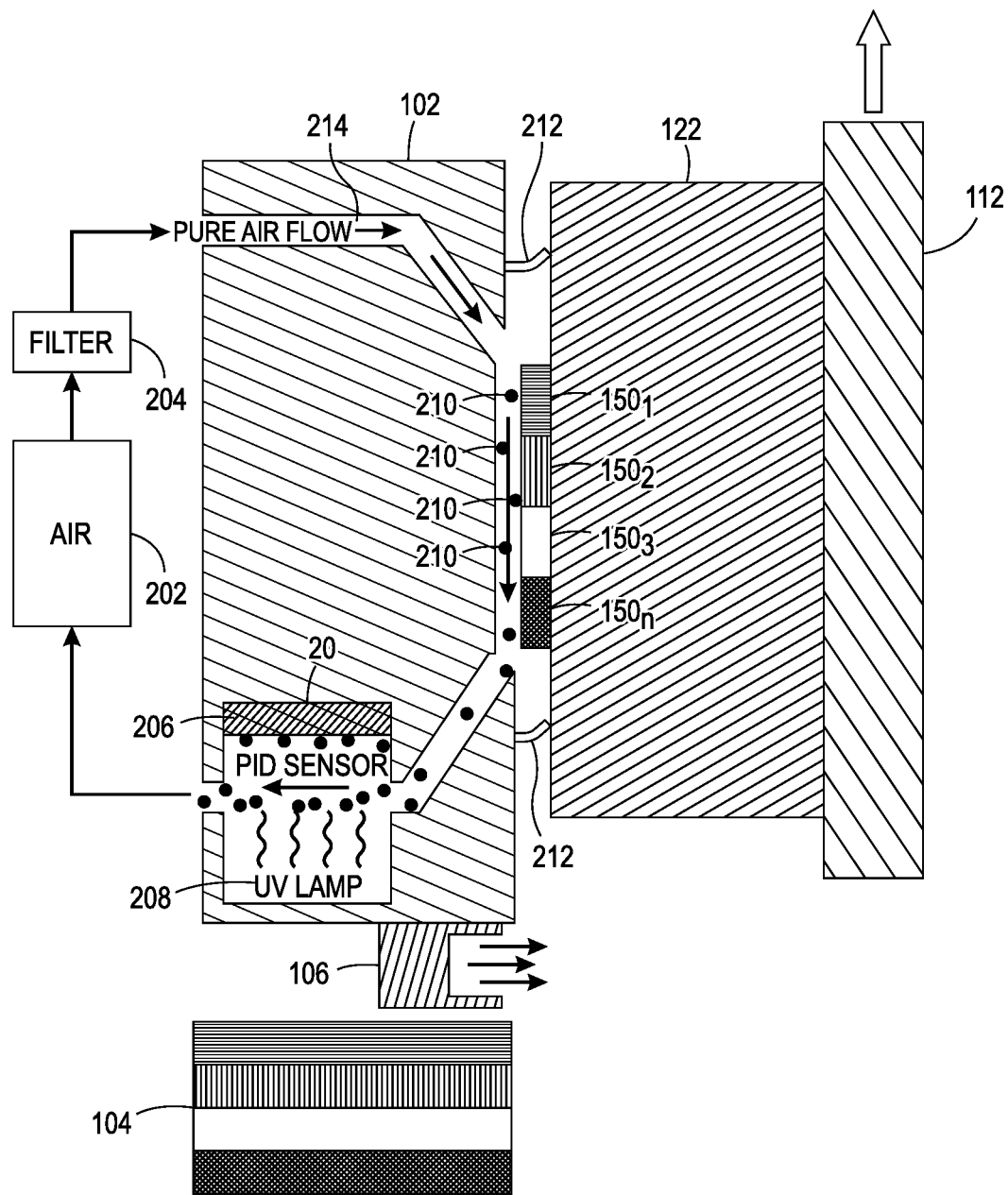
FIG. 2 illustrates an example detailed block diagram of a cure confirmation system.

FIG. 2 illustrates a more detailed block diagram of the cure confirmation system 102. In one embodiment, the cure confirmation system 102 may include an air source 202 and an optional filter 204. Air may be pumped or pulled through an air path 214 that opens to the marking material 150₁ to 150n (hereinafter also referred to individually as marking material 150 or collectively as marking materials 150). The marking material 150₁ to 150n may include one more different colors (e.g., a cyan, magenta, yellow and black).

In one embodiment, one or more seals 212 may be used to confine the air to a volume or an area directly in front of the marking material 150. In one embodiment, the seal 212 may be a flexible material that is coupled to curing confirmation system 102. For example, the flexible material may be coupled to the curing confirmation system 102 in a square shape, or any other geometry that completely surrounds the surface of the object 122 that has the marking material 150. The flexible material may conform to any shape of the surface of the object 122 that has the marking material 150.

The seal 212 may protrude far enough to contact against the surface of the object 122 with enough force to prevent the air from escaping and forcing the air to continue along the air path 214 towards a photo ionization detector (PID) sensor 206.

In another embodiment, the one or more seals 212 may be mechanically moved into position. For example, the one or more seals 212 may be positioned inside of the curing confirmation system 102 until the object 122 is positioned in front of the curing confirmation system 102. Then, the one or more seals 212 may be mechanically moved out of the curing confirmation system 102 towards the surface of the object 122 that has the marking material. The above embodiment may prevent marking material 150 that may not be cured from smearing against the flexible material of the one or more seals 212.

In one embodiment, the flexible material may be a rubber, a silicone, a soft plastic and the like. The flexible material may be inert to prevent any emissions that could be carried by the air to the PID sensor 206 causing a false reading. In the embodiment, where the one or more seals 212 may be mechanically moved, the flexible material may be coupled to a metal or plastic body that moves in and out of the curing confirmation system 102.

After the seal is formed by the one or more seals 212 against the surface of the object 122 that has the marking material 150, the air may collect any VOCs 210 that are emitted from the marking material 150. The air may then continue through the air path 214 to the PID sensor 206. A UV lamp 208 may be applied to the air with the VOCs 210 to break down vapors and gases for measurement. The UV lamp 208 may "ionize" the air and the VOCs 210. The charged gas ions (e.g., the VOCs 210) may flow to a charged plate in the PID sensor 206 and current is produced. The current may be measured, which may correlate to a concentration, or an amount, of the VOCs 210 in the air. The measured amount of VOCs 210 may be sent to the controller 124.

The controller 124 may compare the measured amount of VOCs 210 to a predefined threshold to determine if the marking material 150 is completely cured. If the amount of VOCs 210 is below the predefined threshold, the marking material 150 may be considered to be completely cured. If the amount of VOCs 210 is above the predefined threshold, the marking material 150 may not be completely cured and the controller 124 may move the object 122 back in front of the curing light source 106 for additional curing. Then the object 122 may be moved back in front of the curing confirmation system 102 to determine whether the marking material 150 is completely cured.

In another embodiment, if the marking material 150 is not completely cured, the controller 124 may activate the annunciator 164 or provide a message on the display 162 via the interface 160. The operator of the printing system 100 may then decide how to proceed (e.g., re-cure, re-measure, or remove the object 122 from the printing system 100).

In one embodiment, the marking material 150 may be considered to be completely cured when the amount of VOCs 210 that is measured is less than a predefined threshold. In one embodiment, the predefined threshold may be approximately 500 micrograms per cubic meter ($\mu g/m^3$). For example, at 500 $\mu g/m^3$ or less of VOCs 150 the marking material 150 may be considered to be cured although there may be a potential health risk. In another embodiment, the predefined threshold may be less than 100 $\mu g/m^3$ at which the marking material 150 may be considered to be completely cured with no potential for any health risks. It should be noted that the above predefined thresholds are only one example. Depending on the type of marking material 150 that is used, the predefined thresholds may be adjusted.

In one embodiment, the air may be returned to the air source 202 and be recycled. The filter 204 may filter the air to remove any particulates or contaminants that could produce a false reading before the air is recycled again for a subsequent measurement of VOCs 210.

Figure 3:
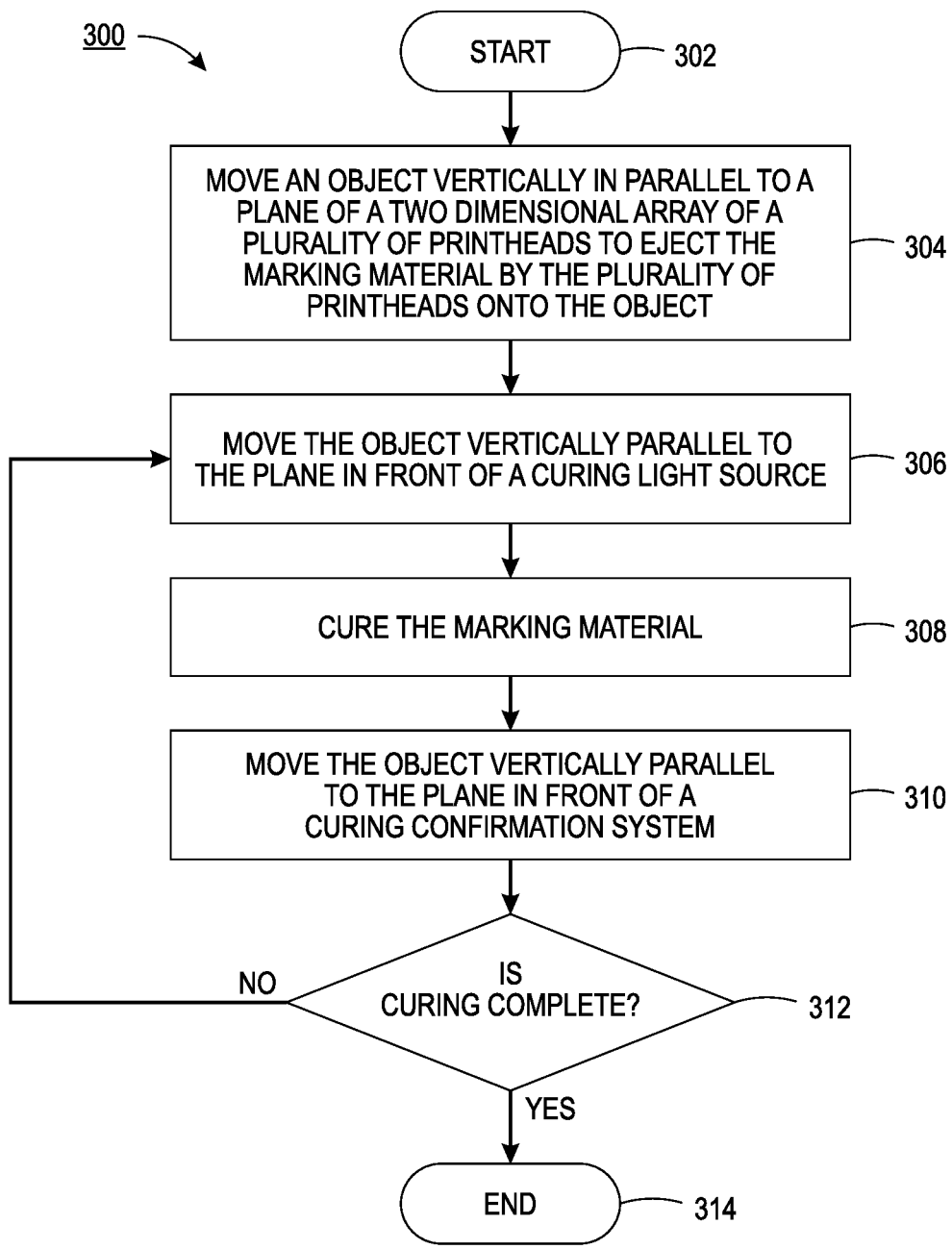
FIG. 3 illustrates a flowchart of an example method for confirming complete curing of a marking material.
Figure 4:
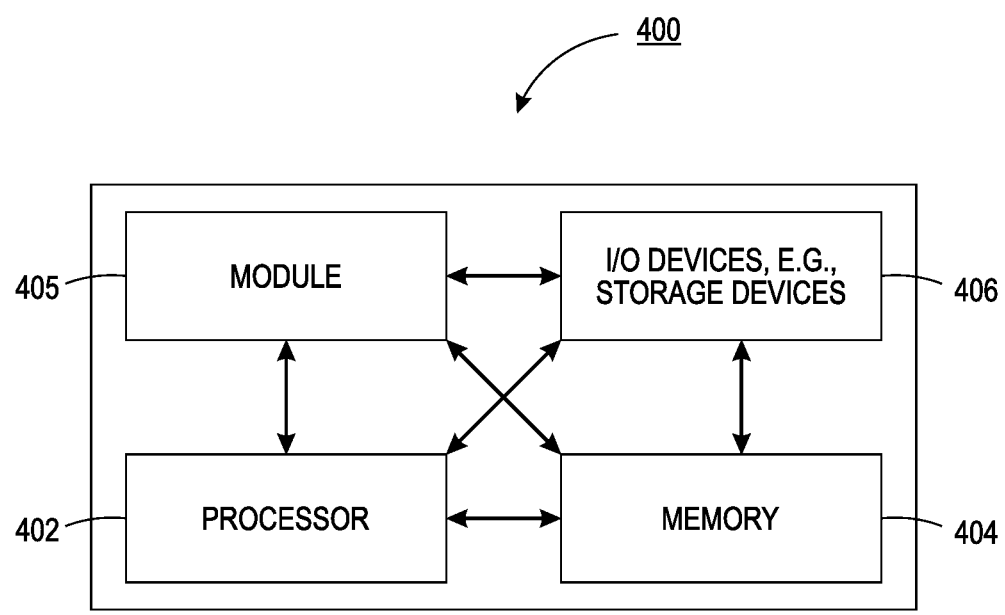
FIG. 4 illustrates a high-level block diagram of a computer suitable for use in performing the functions described herein.

FIG. 3 illustrates a flowchart of an example method 300 for confirming complete curing of a marking material. In one embodiment, one or more steps or operations of the method 300 may be performed by the printing system 100 or a computer that controls operation of the printing system 100 as illustrated in FIG. 4 and discussed below.

At block 302, the method 300 begins. At block 304, the method 300 may move an object vertically in parallel to a plane of a two dimensional array of a plurality of printheads to eject the marking material by the plurality of printheads. For example, the object may be moved by an object holder. The object holder may be mounted to a member that is movably coupled to a support member that may be a vertical post or track. The member may be moved by an actuator vertically up and down the support member parallel to a plane that is formed by a two dimensional array of the plurality of printheads. Said another way, the plane may be an imaginary surface to which each one of the plurality of printheads may be aligned.

When the object is located in front of the plurality of printheads the printheads may eject a marking material onto a surface of the object to form an image or text. Each one of the printheads may eject a different colored marking material. The printheads may be operated by a controller that controls an order or sequence of the marking material that is ejected by each printhead and an amount of the marking material that is ejected. In one embodiment, the marking material may be a UV curable ink.

At block 306, the method 300 moves the object vertically parallel to the plane in front of a curing light source. After the image and/or text is printed onto a surface of the object, the object may be moved along the support member in front of the curing light source.

At block 308, the method 300 cures the marking material. For example, the curing light source may be a UV light source that uses UV emitting LEDs. The curing light source may apply light to cure the marking material. The light source may be emitted at a particular wavelength (e.g., between 315 nanometers (nm) to 400 nm) that can cure the marking material. The exact wavelength of the light that is emitted may be dependent on a color of the marking material and a type of marking material that is used.

At block 310, the method 300 moves the object vertically parallel to the plane in front of a curing confirmation system. In one embodiment, a seal may be applied to the surface of the object that has the marking material. The seal may be mechanically moved into position or may be fixed based on a known distance or gap between the surface of the object to the front surface of the curing confirmation system.

At block 312, the method 300 determines if the curing is complete. In one embodiment, the curing confirmation system may move or force air through an air flow path that moves across the marking material. The air may be moved across the marking material and into a PID sensor of the curing confirmation system. The PID sensor may analyze the air that has moved past the marking material to determine an amount of VOC present in the air.

In one embodiment, a UV light source or any other heat source may ionize the air to allow the charged gas particles to flow to a charged plate in the PID sensor. A current may be produced and the current may be measured, which may correlate to a concentration or an amount of VOCs in the air. The measured amount of VOCs may be sent to a controller of the print system.

In one embodiment, the controller may compare the amount of VOCs to a predefined threshold that indicates whether the marking material is completely cured. If the amount of VOCs is above the predefined threshold, then the controller may determine that the marking material is not completely cured. In one embodiment, the method 300 may return to block 306 and blocks 306-312 may be repeated until the marking material is completely cured. In one embodiment, the controller may activate an annunciator on an interface of the print system or display a message indicating that the marking material is not completely cured.

If the amount of VOCs is below the predefined threshold, then the controller may determine that the marking material completely cured and that the print process is complete. The object may be removed from the printing system. At block 314, the method 300 ends.

It should be noted that the blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for confirming complete curing of a marking material, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for confirming complete curing of a marking material (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for confirming complete curing of a marking material (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A print system, comprising:
   a plurality of printheads arranged in a two-dimensional array, wherein each one of the plurality of printheads is configured to eject a marking material;
   a curing light source coupled to the two-dimensional array of the plurality of printheads;
   a curing confirmation system coupled to the curing light source, the curing confirmation system, comprising:
      an air source;
      an air flow path that moves air from the air source out of the curing confirmation system, across the marking material on an object and into a photo ionization detector (PID) sensor; and
      a seal to enclose the air flow path around the marking material on the object, wherein the seal comprises a flexible material that fits against the object having a curved surface;
   a movable member to hold the object, wherein the movable member is positioned parallel to a plane formed by the two-dimensional array of the plurality of printheads, the curing light source and the curing confirmation system; and
   a controller to control movement of the movable member to move the object past the array of printheads, to operate the plurality of printheads to eject the marking material onto the object as the object passes the two-dimensional array of printheads, to operate the curing light source to cure the marking material, and to operate the curing confirmation system to confirm that the curing of the marking material is complete.

2. The print system of claim 1, wherein the marking material comprises an ultra violet cured ink.

3. The print system of claim 1, wherein the curing light source comprises an ultra violet (UV) light source.

4. The print system of claim 3, wherein the UV light source comprises a two-dimensional array of UV light emitting diodes (LEDs).

5. The print system of claim 1, wherein the curing light source is positioned to cure the marking material after the marking material is ejected by the plurality of printheads onto the object.

6. The print system of claim 5, wherein the curing confirmation system is positioned to confirm that the curing of the marking material is complete after the curing light source has cured the marking material on the object.

7. The print system of claim 1, wherein curing confirmation system transmits a signal to the controller to repeat operation of the curing light source to cure the marking material when the PID sensor detects an amount of volatile organic compounds that is below a predefined threshold.

8. The print system of claim 1, further comprising:
   an optical sensor to scan the object and determine a profile of the object.

9. The print system of claim 1, wherein the controller is further to determine a sequence of operation of the two-dimensional array of printheads.

10. The print system of claim 1, wherein the controller is further to determine an amount of the marking material to eject from each printhead of the two-dimensional array of printheads.

11. The print system of claim 1, wherein the plurality of printheads, the curing light source, and the curing confirmation system are stacked vertically.

12. The print system of claim 11, wherein the curing light source is stacked vertically above the plurality of printheads and the curing confirmation system is stacked vertically above the curing light source.

13. The print system of claim 1, further comprising:
   a support member coupled to the movable member, wherein the support member is positioned to be parallel to a plane formed by the plurality of printheads.

14. The print system of claim 13, further comprising:
   an actuator coupled to the movable member to move the movable member along the support member.

15. The print system of claim 13, the movable member further comprising:
   an object holder coupled to the movable member to hold the object.

16. The print system of claim 15, wherein the object holder comprises one of a plurality of different removable object holders that is selected based on a shape and size of the object.

17. A print system, comprising:
   a plurality of printheads arranged in a two-dimensional array, wherein each one of the plurality of printheads is configured to eject a marking material;
   a curing light source coupled to the two-dimensional array of the plurality of printheads;
   a curing confirmation system coupled to the curing light source, the curing confirmation system, comprising:
      an air source;

an air flow path that moves air from the air source out of the curing confirmation system, across the marking material on an object and into a photo ionization detector (PID) sensor; and a seal to enclose the air flow path around the marking material on the object, wherein the seal is mechanically movable towards the object;

a movable member to hold the object, wherein the movable member is positioned parallel to a plane formed by the two-dimensional array of the plurality of printheads, the curing light source and the curing confirmation system; and a controller to control movement of the movable member to move the object past the array of printheads, to operate the plurality of printheads to eject the marking material onto the object as the object passes the two-dimensional array of printheads, to operate the curing light source to cure the marking material, and to operate the curing confirmation system to confirm that the curing of the marking material is complete.

* * * * *